(12) United States Patent
Umemura et al.

(10) Patent No.: US 12,433,568 B2
(45) Date of Patent: Oct. 7, 2025

(54) ULTRASONIC IMAGE PROCESSING DEVICE

(71) Applicant: SONIRE THERAPEUTICS INC., Tokyo (JP)

(72) Inventors: Shin-ichiro Umemura, Sendai (JP); Shin Yoshizawa, Sendai (JP); Ikumi Shiozaki, Sendai (JP)

(73) Assignee: Sonire Therapeutics Inc., Tokyo (JP)

( * ) Notice: Subject to any disclaimer, the term of this patent is extended or adjusted under 35 U.S.C. 154(b) by 0 days.

(21) Appl. No.: 18/559,649

(22) PCT Filed: Mar. 11, 2022

(86) PCT No.: PCT/JP2022/010971
§ 371 (c)(1),
(2) Date: Nov. 8, 2023

(87) PCT Pub. No.: WO2023/132088
PCT Pub. Date: Jul. 13, 2023

(65) Prior Publication Data
US 2024/0225593 A1    Jul. 11, 2024

(30) Foreign Application Priority Data
Jan. 4, 2022 (JP) .................. 2022-000213

(51) Int. Cl.
*A61B 8/14* (2006.01)
*A61B 8/00* (2006.01)
(Continued)

(52) U.S. Cl.
CPC .............. *A61B 8/14* (2013.01); *A61B 8/4444* (2013.01); *A61B 8/4483* (2013.01); *A61B 8/461* (2013.01);
(Continued)

(58) Field of Classification Search
CPC .... A61N 2007/0052; A61N 7/02; A61N 7/00; A61B 8/52; A61B 8/461; A61B 8/4483; A61B 8/4444; A61B 8/14
See application file for complete search history.

(56) References Cited

U.S. PATENT DOCUMENTS

| | | |
|---|---|---|
| 5,158,071 A | 10/1992 | Umemura et al. |
| 5,435,311 A | 7/1995 | Umemura et al. |
| (Continued) | | |

FOREIGN PATENT DOCUMENTS

| | | |
|---|---|---|
| JP | H08-71069 A | 3/1996 |
| JP | 2741907 B2 | 4/1998 |
| (Continued) | | |

OTHER PUBLICATIONS

International Search Report (& translation) and Written Opinion issued in PCT/JP2022/010971, mailed May 31, 2022.

*Primary Examiner* — John D Li
(74) *Attorney, Agent, or Firm* — ICE MILLER LLP; Justin D. Swindells

(57) ABSTRACT

Apparatus and method to clearly indicate a region in which a bubble based on therapeutic ultrasonic waves is occurring. A controller acquires reception signals based on an ultrasonic waves that have been transmitted from an ultrasonic probe at differing phases and timings, reflected by a biological tissue, and received by the ultrasonic probe. The controller adds the reception signals to generate a higher harmonic reception signal. The controller acquires a fundamental wave reception signal, which is one of the reception signals. The controller determines a comparison value which represents the difference between the value of the higher harmonic reception signal and the value of the fundamental wave reception signal. The controller determines, on the basis of the comparison value, whether a processing target pixel indicated by the higher harmonic reception signal or the fundamental wave reception signal indicates a cavitation region or a normal region.

11 Claims, 4 Drawing Sheets

(51) Int. Cl.
    *A61N 7/00*         (2006.01)
    *A61N 7/02*         (2006.01)

(52) U.S. Cl.
    CPC .................. *A61B 8/52* (2013.01); *A61N 7/00* (2013.01); *A61N 7/02* (2013.01); *A61N 2007/0052* (2013.01)

(56) References Cited

U.S. PATENT DOCUMENTS

| | | | |
|---|---|---|---|
| 2008/0228076 A1* | 9/2008 | Azuma | G01S 7/52039 600/458 |
| 2009/0177085 A1* | 7/2009 | Maxwell | A61B 17/22004 606/128 |
| 2012/0041309 A1 | 2/2012 | Coussios et al. | |
| 2016/0089109 A1 | 3/2016 | Coussios et al. | |
| 2016/0242746 A1* | 8/2016 | Rao | A61B 6/56 |
| 2018/0206816 A1 | 7/2018 | Prus et al. | |
| 2018/0271480 A1* | 9/2018 | Kawabata | A61B 8/4494 |

FOREIGN PATENT DOCUMENTS

| | | |
|---|---|---|
| JP | 2012-507320 A | 3/2012 |
| JP | 2020-505134 A | 2/2020 |
| WO | 2005/087109 A1 | 9/2005 |
| WO | 2017/126037 A1 | 7/2017 |

* cited by examiner

ULTRASONIC IMAGE PROCESSING DEVICE

CROSS-REFERENCE TO RELATED APPLICATIONS

This application is a National Stage of International Patent Application No. PCT/JP2022/010971, filed on Mar. 11, 2022, which claims priority to Japanese Patent Application No. JP 2022-000213, filed on Jan. 4, 2022, the disclosures of which are incorporated by reference in their entireties.

TECHNICAL FIELD

The present invention relates to an ultrasonic image processing device, and particularly relates to a technology using therapeutic ultrasound.

BACKGROUND

A treatment device using a high intensity focused ultrasound treatment method has been widely used. This treatment device is called a high intensity focused ultrasound (HIFU) irradiation device or a HIFU irradiation system, and a site to be treated is irradiated with ultrasonic waves to destroy tissue.

In general, the HIFU irradiation device includes a plurality of ultrasonic transducers disposed on a bowl-shaped surface. The plurality of ultrasonic transducers are disposed such that ultrasonic waves emitted from the respective ultrasonic transducers are focused on one point to form a focal point. During treatment, the focal point is aligned with a site to be treated, and the site to be treated is irradiated with the ultrasonic waves. An ultrasonic diagnosis device that shows the focal point on an ultrasonic image is used to confirm the irradiated location.

JP H08-71069 A describes an ultrasonic treatment device that observes the location of the focal point using an ultrasonic diagnosis device that displays a B-mode image (tomographic image). With this device, ultrasonic waves of weak level that do not affect the tissue are emitted from therapeutic ultrasonic transducers, and an ultrasonic imaging probe transmits and receives ultrasonic waves to display a tomographic image. Since acoustic properties of tissue of a test subject change according to a change in temperature, the location of the focal point is indicated using strong and weak brightness on the tomographic image.

WO 2005/087109 describes, as a technology related to the invention of the present application, a technology in which echo components produced in a scattered manner by a micro-bubble-based contrast agent are visualized while distinguishing the echo components from components produced by nonlinear propagation of transmitted pulses.

SUMMARY

In general, when an affected area of body tissue is irradiated with therapeutic ultrasound, bubbles (cavities) are formed at the irradiated area due to cavitation. In a treatment using a conventional HIFU irradiation device, irradiation of the affected area with therapeutic ultrasound was confirmed by observation of the locations of bubbles formed by cavitation, and observation of the body tissue of a patient. The observation of the locations of bubbles is performed, for example, by harmonic imaging in which ultrasonic waves are transmitted from an ultrasonic probe toward the affected area, and higher harmonics generated from around the bubbles are received by the ultrasonic probe. Moreover, the observation of the body tissue of the patient is performed by acquiring a B-mode image by transmission and reception of ultrasonic waves with the ultrasonic probe. However, high intensity scatterers with discontinuous ultrasonic propagation characteristics may be present in the body tissue. With the confirmation method using harmonic imaging of the conventional technology, noise based on high intensity scatterers sometimes appears in the image.

An advantage of the present invention is to clearly indicate a region in which a bubble based on therapeutic ultrasound is formed.

The present invention includes: a controller that executes: reception processing for acquiring a plurality of received signals based on a plurality of ultrasonic waves transmitted from an ultrasonic probe at different phases and timings, reflected from body tissue, and received by the ultrasonic probe; combining processing for generating a higher harmonic received signal by combining the plurality of received signals; and comparison processing for finding a comparison value representing a difference between a value of the higher harmonic received signal and a value of a fundamental wave received signal that is one of the plurality of received signals, wherein the controller executes determination processing for determining whether an ultrasound pixel indicated by the higher harmonic received signal or the fundamental wave received signal indicates a cavitation region or a normal region, and the determination processing includes processing for determining that the ultrasound pixel indicates the cavitation region if the comparison value corresponding to the ultrasound pixel indicates that the value of the higher harmonic received signal is higher than the value of the fundamental wave received signal by a predetermined amount.

The plurality of received signals are preferably signals based on a plurality of reflected ultrasonic waves received by the ultrasonic probe, based on M types of ultrasonic waves sequentially transmitted from the ultrasonic probe with a phase difference of 360°/M.

The comparison value is preferably a value based on the ratio of the value of the higher harmonic received signal to the value of the fundamental wave received signal.

The ultrasonic probe preferably has a filter characteristic that attenuates higher harmonic components of each of the received signals.

The present invention preferably has a filter for attenuating higher harmonic components of each of the received signals, and the determination processing is processing based on each of the received signals with the higher harmonic components attenuated by the filter.

The controller preferably generates, based on the higher harmonic received signal or the fundamental wave received signal, image data for displaying the cavitation region and the normal region in different manners.

According to the present invention, it is possible to clearly indicate a region in which a bubble based on therapeutic ultrasound is formed.

DESCRIPTION OF THE ILLUSTRATED EMBODIMENTS

An embodiment of the present invention will be described with reference to the drawings. For the same item shown in a plurality of drawings, the item is labeled with the same reference sign, and repeated description thereof is omitted.

Figure 1:
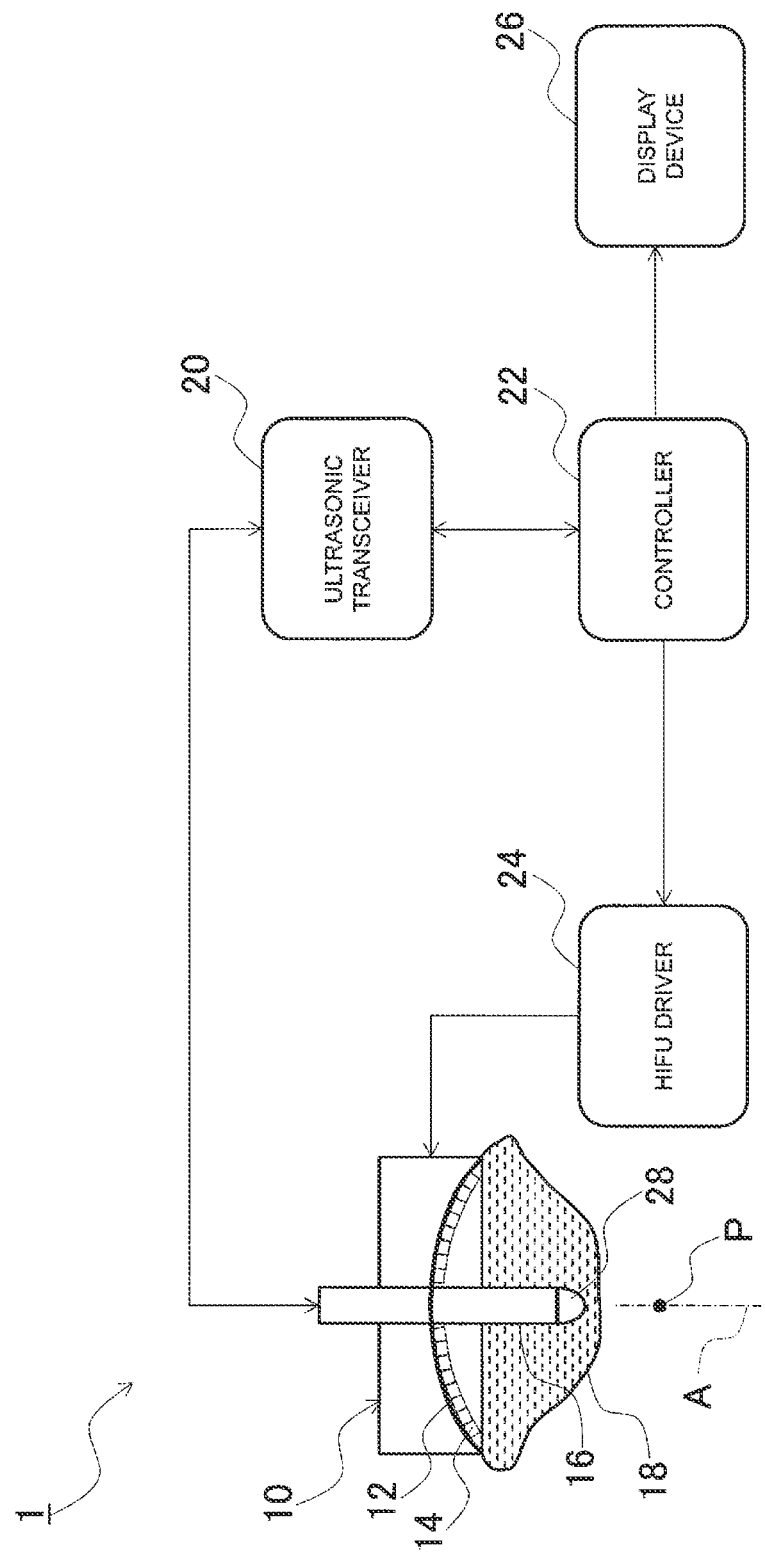
FIG. 1 is a view showing a configuration of a HIFU irradiation device.

In FIG. 1, a configuration of a HIFU irradiation device 1 according to an embodiment of the present invention is shown. The HIFU irradiation device 1 includes a HIFU transducer unit 10, an ultrasonic probe 16, a coupling bag 18, an ultrasonic transceiver 20, a controller 22, a HIFU driver 24, and a display device 26.

The HIFU transducer unit 10 includes a housing 12 in the form of a container with an opening directed downward, and a plurality of ultrasonic transducers 14 secured to the housing 12. The plurality of ultrasonic transducers 14 are, for example, disposed in the form of an upwardly convex curved surface, and are secured to the housing 12 such that, when the ultrasonic transducers 14 emit ultrasonic waves, the intensity of the ultrasonic waves is stronger at a treatment reference point P below the housing 12. In other words, each of the ultrasonic transducers 14 is secured to the housing 12 so as to form a focal point at the treatment reference point P.

The ultrasonic probe 16 is attached to the housing 12 so as to transmit and receive ultrasonic waves at a location which is below the housing 12 and above the treatment reference point P. In the present embodiment, the ultrasonic probe 16 passes through the apex of the housing 12 in the up-down direction, and a tip thereof that transmits and receives ultrasonic waves faces downward. A plurality of imaging ultrasonic transducers 28 are disposed at the tip of the ultrasonic probe 16. The ultrasonic probe 16 may be movable in the up-down direction. Moreover, the ultrasonic probe 16 may be rotatable about the longitudinal axis.

Provided below the HIFU transducer unit 10 is the coupling bag 18 that matches acoustic impedance between the ultrasonic transducers 14 and a patient, and between the ultrasonic probe 16 and the patient. The coupling bag 18 may be a bag filled with a liquid such as water.

The controller 22 may be a personal computer, a tablet computer, or the like. Connected to the controller 22 is operation equipment (not shown) for a user to operate the HIFU irradiation device 1. The operation equipment may include a mouse, a touch panel integrated with the display device 26, a switch, a keyboard, etc.

The HIFU driver 24 may include an electric circuit that drives the ultrasonic transducers 14 to generate ultrasonic waves. The HIFU driver 24 causes the ultrasonic transducers 14 to generate ultrasonic waves, according to control by the controller 22. Moreover, the HIFU driver 24 adjusts, according to control by the controller 22, the intensity of ultrasonic waves generated by the ultrasonic transducers 14.

The ultrasonic transceiver 20 includes an electric circuit that outputs electric signals to the plurality of imaging ultrasonic transducers 28 of the ultrasonic probe 16, and acquires electric signals output from the imaging ultrasonic transducers 28. The ultrasonic transceiver 20 executes the following processing, according to control by the controller 22. That is, the ultrasonic transceiver 20 causes the ultrasonic probe 16 to transmit imaging ultrasonic waves, and to scan a beam of the transmitted imaging ultrasonic waves (ultrasonic beam). The ultrasonic beam is scanned on an observation surface including a central axis A extending from the topmost portion of the housing 12 in the up-down direction. The ultrasonic transceiver 20 causes the ultrasonic probe 16 to receive reflected ultrasonic waves from a direction toward which the ultrasonic beam is directed, receives received signals based on the reflected ultrasonic waves received from each direction toward which the ultrasonic beam is directed, and outputs the received signals to the controller 22.

The controller 22 generates ultrasound data based on the received signals acquired on the observation surface. The ultrasound data may be irradiated-region data indicating a region (cavitation region) in which higher harmonic components are generated in body tissue of the patient, or B-mode image data indicating a B-mode image (tomographic image) acquired for the body tissue of the patient.

Note that the ultrasonic transceiver 20 may cause the ultrasonic probe 16 to generate plane waves. In this case, imaging ultrasonic waves are simultaneously transmitted from the plurality of imaging ultrasonic transducers 28 aligned on the ultrasonic probe 16. The ultrasonic transceiver 20 acquires received signals based on the reflected ultrasonic waves received from the respective imaging ultrasonic transducers 28, and outputs the received signals to the controller 22. The controller 22 generates ultrasound data based on a plurality of received signals corresponding to the plurality of imaging ultrasonic transducers 28.

Before irradiating the patient with therapeutic ultrasound from the HIFU transducer unit 10, for example, positioning processing is executed as follows. The HIFU driver 24 causes each of the ultrasonic transducers 14 to transmit ultrasonic waves of a smaller intensity than that in a treatment. The ultrasonic transceiver 20 causes the ultrasonic probe 16 to scan the ultrasonic beam on the observation surface, according to the control by the controller 22, acquires B-mode image data as ultrasound data, and outputs the ultrasound data to the controller 22. The controller 22 displays the B-mode image on the display device 26. The user as an practitioner refers to the B-mode image displayed on the display device 26, and confirms the difference between the focal point of the ultrasonic waves transmitted from the HIFU transducer unit 10 and the location of the affected area.

When the difference between the location of the focal point and the location of the affected area is not within an allowable range, the user changes the locations or the positions of the ultrasonic probe 16 and the HIFU transducer unit 10. After confirming that the location of the focal point and the location of the affected area match, the user operates the controller 22 for treatment. The controller 22 controls the HIFU driver 24, according to the operation by the user. The HIFU driver 24 causes the ultrasonic transducers 14 to transmit therapeutic ultrasound having an intensity necessary for the treatment, according to the control by the controller 22. Consequently, the body tissue is cauterized at the focal point, and the treatment is administered.

Figure 2:
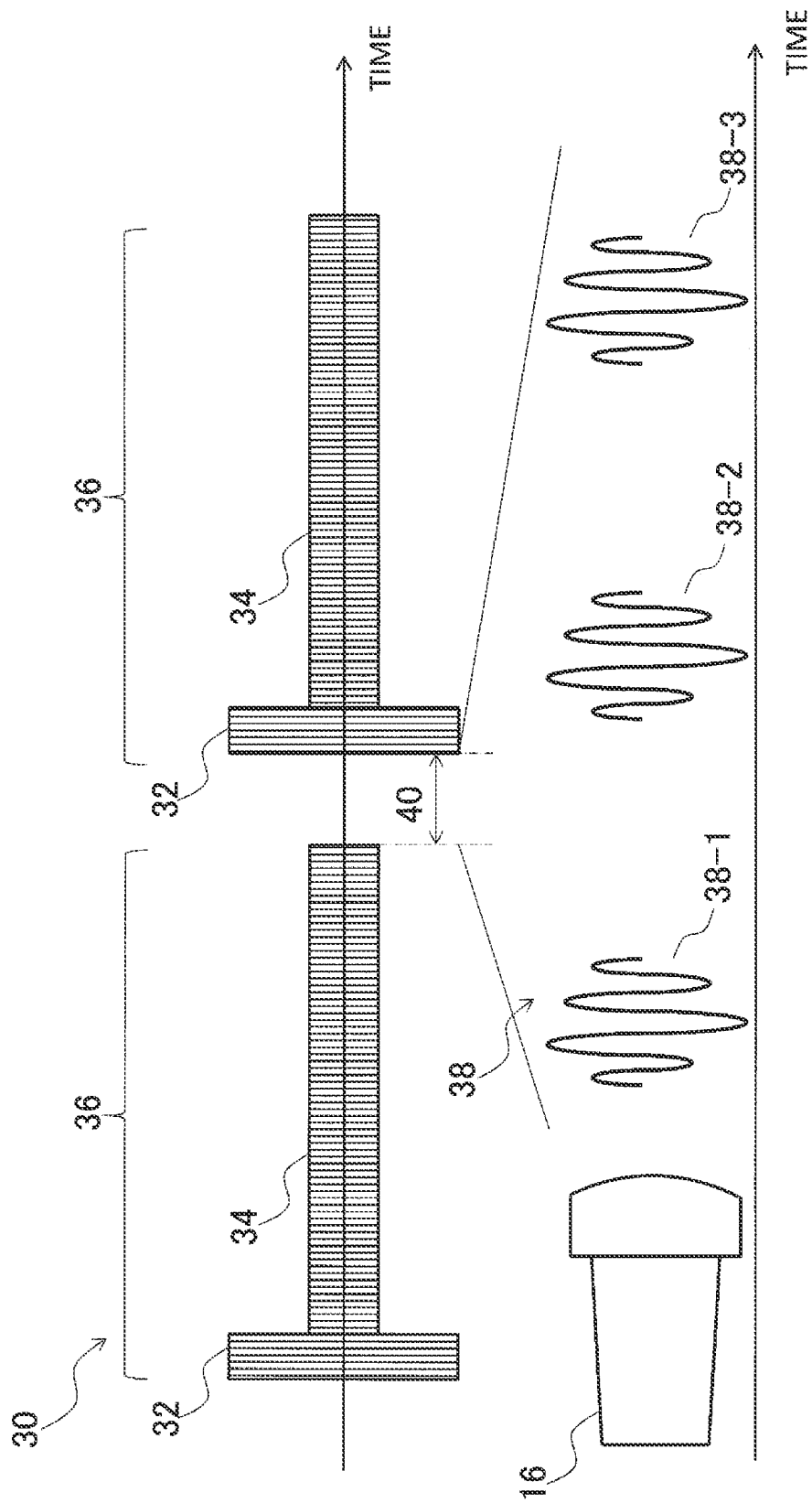
FIG. 2 is a view conceptually showing time waveforms of therapeutic ultrasound and imaging ultrasonic waves.

The HIFU irradiation device 1 executes irradiated-region display processing for displaying an image, which shows an irradiated region irradiated with the therapeutic ultrasound, in a superimposed manner on the B-mode image, on the display device 26 while irradiating the patient with the therapeutic ultrasound. Here, the processing for displaying the two images in a superimposed manner may be processing for generating new image data by combining image data so that one image can be seen through the other image, and displaying an image based on the new image data. FIG. 2 conceptually shows time waveforms of therapeutic ultrasound 30 transmitted from the HIFU transducer unit 10, and imaging ultrasonic waves 38 transmitted from the ultrasonic probe 16 during the execution of the irradiated-region display processing.

The therapeutic ultrasound 30 is composed of strong and weak ultrasonic pulses 36, each including a strong-level ultrasonic wave 32, and a weak-level ultrasonic wave 34 following the strong-level ultrasonic wave 32. The strong and weak ultrasonic pulse 36 is repeatedly transmitted from the HIFU transducer unit 10 over time. An irradiation pause period 40 is provided between adjacent strong and weak ultrasonic pulses 36 on the time axis, and transmission of the therapeutic ultrasound 30 is stopped during the irradiation pause period 40.

When the strong and weak ultrasonic pulses 36 are transmitted from the HIFU transducer unit 10, the body tissue is cauterized at the focal point. The body tissue is irradiated with the strong-level ultrasonic waves 32, bubbles are generated from the body tissue, and the state in which the bubbles are generated is maintained by irradiation with the weak-level ultrasonic waves 34.

In the example shown in FIG. 2, the imaging ultrasonic waves 38 for generating ultrasound data are transmitted three times from the ultrasonic probe 16 during the irradiation pause period 40. A second imaging ultrasonic wave 38-2 which is transmitted at the second time is delayed by a phase of 120° from a first imaging ultrasonic wave 38-1 which is transmitted at the first time. A third imaging ultrasonic wave 38-3 which is transmitted at the third time is delayed by a phase of 120° from the second imaging ultrasonic wave 38-2.

The respective imaging ultrasonic waves 38 are reflected within the body tissue. When the respective imaging ultrasonic waves 38 are reflected around the bubbles formed by the strong and weak ultrasonic pulses 36, higher harmonics are generated. Therefore, reflected ultrasonic waves reflected from the body tissue include the high harmonics due to the bubbles, in addition to a fundamental wave. In general, the larger the amount of bubbles formed, the greater the intensity of harmonics generated.

Returning to FIG. 1, processing for receiving reflected waves with respect to the respective imaging ultrasonic waves 38 by the HIFU irradiation device 1 will be described. The ultrasonic probe 16 receives first to third imaging ultrasonic waves with respect to the first imaging ultrasonic wave 38-1 to the third imaging ultrasonic wave 38-3, and outputs first to third received signals to the ultrasonic transceiver 20. The ultrasonic transceiver 20 performs amplification and the like on the first to third received signals, and outputs the signals to the controller 22.

The controller 22 generates a higher harmonic received signal by adding together (combining) the first to third received signals. In the signal obtained by adding the first to third received signals together, a fundamental wave component is decreased due to the phase relation of the first imaging ultrasonic wave 38-1 to the third imaging ultrasonic wave 38-3.

When the imaging ultrasonic waves transmitted from the ultrasonic probe 16 form an ultrasonic beam, the controller 22 generates a higher harmonic received signal with respect to the first to the third reflected ultrasonic wave coming from each direction to which the ultrasonic beam is directed. The controller 22 generates irradiated-region data based on the higher harmonic received signal generated with respect to each direction. The irradiated-region data is equivalent to image data showing an irradiated-region image based on harmonic imaging. The irradiated-region image shows a cavitation region in which bubbles were generated and a normal region in which bubbles were not generated within the region to which the imaging ultrasonic waves were transmitted.

The controller 22 uses one of the first to third received signals as a fundamental wave received signal, and generates a B-mode image from the fundamental wave received signal. For example, the controller 22 generates, based on the second reflected ultrasonic waves coming from each direction to which the ultrasonic beam is directed, a fundamental wave received signal with respect to each direction, generates pixel data of the B-mode image for each direction from each fundamental wave received signal, and generates B-mode image data based on the pixel data generated with respect to each direction. Note that the reflected ultrasonic wave serving as the source of the B-mode image data may be the first reflected ultrasonic wave, or the third reflected ultrasonic wave. In other words, the first received signal may be the fundamental received signal, or the third received signal may be the fundamental received signal.

Note that, when the imaging ultrasonic waves transmitted from the ultrasonic probe 16 do not necessarily form an ultrasonic beam, such as when the imaging ultrasonic wave form a plane wave, the controller 22 generates higher harmonic received signals with respect to the first to third reflected ultrasonic waves received by the respective imaging ultrasonic transducers 28 of the ultrasonic probe 16. In other words, the controller 22 generates higher harmonic received signals for the plurality of imaging ultrasonic transducers 28, respectively. The controller 22 generates irradiated-region data, based on higher harmonic received signals of a plurality of channels generated with respect to the plurality of imaging ultrasonic transducers 28. Moreover, the controller 22 generates the B-mode image data, based on one of the first to third reflected ultrasonic waves received by each of the imaging ultrasonic transducers 28. In other words, the controller 22 acquires a fundamental wave received signal for each of the plurality of imaging ultrasonic transducers 28.

In the above, the processing for transmitting the imaging ultrasonic waves for ultrasound data generation, three times, has been described. The imaging ultrasonic waves may be transmitted twice, or four or more times. When the imaging ultrasonic waves are transmitted M times, the phase difference between adjacent imaging ultrasonic waves on the time axis is 360°/M. Alternatively, the phases of the respective imaging ultrasonic waves may be set such that the phases of $\theta+i\cdot 360°/M$ ($\theta$ is any phase, and i is an integer from 0 to M−1) are assigned to M number of imaging ultrasonic waves, independently of the transmission order.

The controller 22 generates a higher harmonic received signal by adding together (combining) the first to Mth received signals. Moreover, the controller 22 generates a fundamental wave received signal, based on one of the first to Mth reflected ultrasonic waves, and generates a B-mode image from the fundamental wave received signal.

The controller 22 displays, on the display device 26, an image (B-mode irradiated-region image) formed by superimposing the irradiated-region image on the B-mode image, based on the irradiated-region data and the B-mode image data.

The controller 22 generates the irradiated-region data and the B-mode image data at a frame time interval (the inverse of a frame rate). The controller 22 sequentially displays the B-mode irradiated-region images on the display device 26 over time.

Cavitation region discrimination processing which is executed by the HIFU irradiation device 1 according to the present embodiment will be described. High intensity scatterers with discontinuous ultrasonic propagation characteristics may be present in body tissue. Therefore, noise based on the high intensity scatters may appear in an irradiated-region image formed using directly the higher harmonic received signals. Thus, it may be difficult for the user to decide whether an image of bubbles appears, or noise appears, in the irradiated-region image.

Therefore, the HIFU irradiation device 1 according to the present embodiment executes the cavitation region discrimination processing. In other words, the HIFU irradiation device 1 determines whether each pixel in the irradiated-region image, the B-mode irradiated-region image, or the B-mode image is a pixel indicating a cavitation region, or a pixel indicating a normal region. For example, the HIFU irradiation device 1 displays the irradiated-region image, the B-mode irradiated-region image, or the B-mode image such that the pixels indicating the cavitation region and the pixels indicating a normal region are displayed in different manners. For example, the HIFU irradiation device 1 may display the irradiated-region image, the B-mode irradiated-region image, or the B-mode image such that the pixels indicating the cavitation region and the pixels indicating a normal region are displayed in different colors and different brightness levels.

Figure 3:
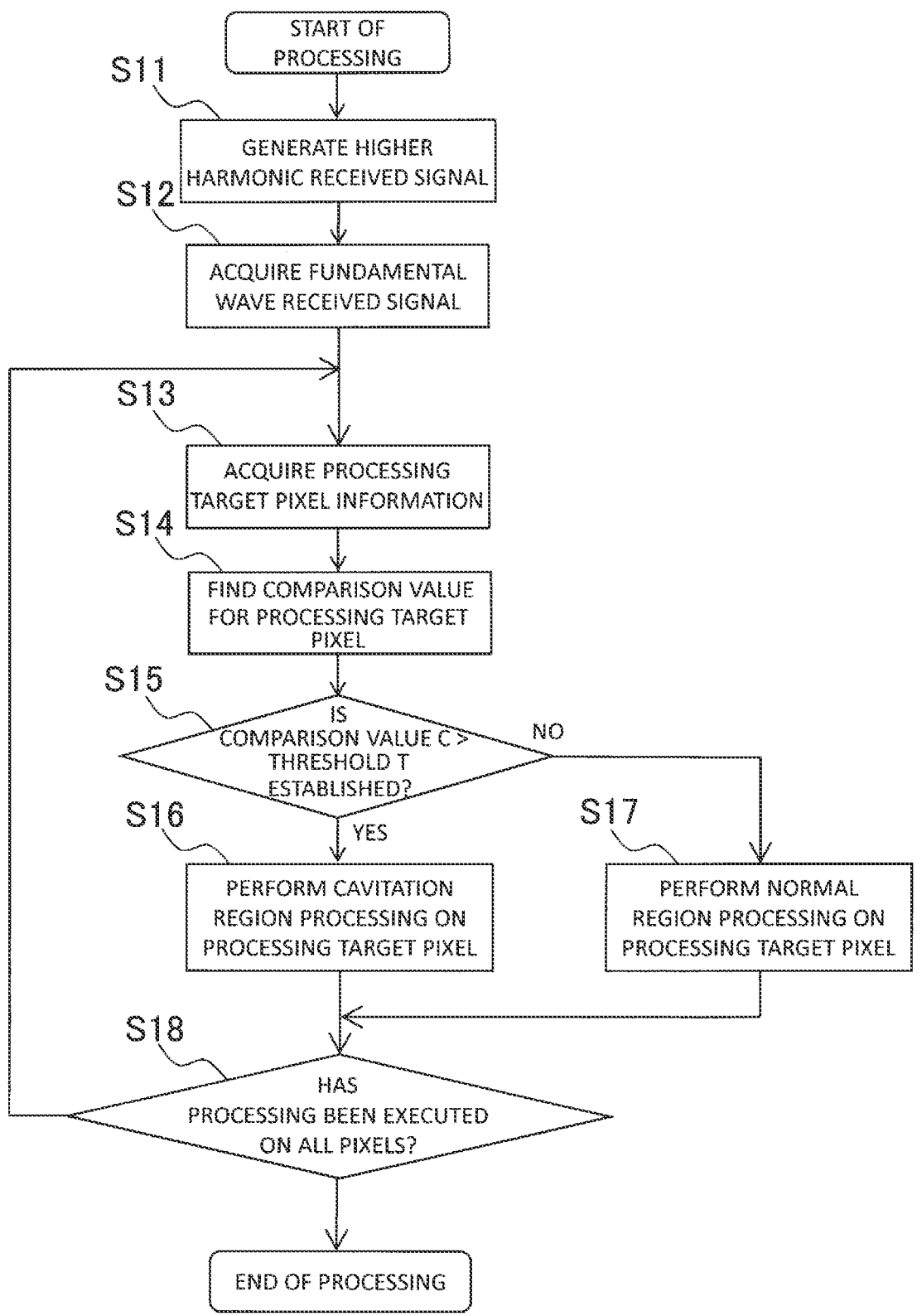
FIG. 3 is a flowchart showing cavitation region discrimination processing.

In FIG. 3, a flowchart showing the cavitation region discrimination processing is shown. As explained with reference to FIG. 2, the controller 22 causes the HIFU transducer unit 10 to transmit therapeutic ultrasound, and causes the ultrasonic probe 16 to transmit imaging ultrasonic waves in one ultrasonic beam direction three times, and receive the first to third reflected ultrasonic waves. The controller 22 generates a higher harmonic received signal by adding together the first to third received signals generated according to the first to third reflected ultrasonic waves (S11). Moreover, the controller 22 acquires a predetermined received signal among the first to third received signals as a fundamental wave received signal (S12).

The pixel values of a plurality of pixels aligned in a direction of traveling (depth direction) from the ultrasonic probe 16 to the body tissue are acquired from each of the higher harmonic received signal and the fundamental wave signal acquired for the one ultrasonic beam direction. A cycle of processing from steps S13 to S18 is executed on one processing target pixel selected sequentially from the plurality of pixels aligned in the depth direction.

The controller 22 acquires processing target pixel information for one processing target pixel selected sequentially from the plurality of pixels aligned in the depth direction (S13). The processing target pixel information is information (Ph, P1) which associates a value Ph (higher harmonic received signal value Ph) that the higher harmonic received signal indicates for the processing target pixel with a value P1 (fundamental wave received signal value P1) that the fundamental wave received signal indicates for the processing target pixel. The higher harmonic received signal value Ph and the fundamental wave received signal value P1 may be values obtained by taking the moving average of another one or more pixels aligned in a shallower direction from the processing target pixel, another one or more pixels aligned in a deeper direction from the processing target pixel, or a plurality of other pixels aligned in the shallower direction and the deeper direction, and the processing target pixel.

The controller 22 finds a comparison value C with respect to the processing target pixel (S14). Here, the comparison value C is the ratio of the higher harmonic received signal value Ph to the fundamental wave received signal value P1. The controller 22 finds the comparison value C as C=Ph/P1.

The controller 22 determines whether the comparison value C is greater than a predetermined threshold T (S15). Here, the threshold T may be a value read into the controller 22 by the user operating operation equipment connected to the controller 22. Moreover, the threshold T may be found as T=Ph0/P10 from the ratio of the higher harmonic received signal value Ph0 to the fundamental wave received signal value P10 when therapeutic ultrasound is not transmitted.

When the comparison value C is greater than the threshold T (S16), the controller 22 performs cavitation region processing on the processing target pixel. The cavitation region processing may be, for example, processing for generating region identifying pixel information (Ph, P1, F (=1)) by adding flag information F=1, which indicates that the processing target pixel is a pixel indicating a cavitation region, to the processing target pixel information (Ph, P1).

When the comparison value C is equal to or less than the threshold T, the controller 22 performs normal region processing on the processing target pixel (S17). The normal region processing may be, for example, processing for generating region identifying pixel information (Ph, P1, F (=0)) by adding flag information F=0, which indicates that the processing target pixel is a pixel indicating a normal region, to the processing target pixel information (Ph, P1).

A principle will be described later which makes it possible to determine whether or not the processing target pixel indicates a cavitation pixel, based on the comparison between the comparison value and the threshold T.

The controller 22 determines, for the higher harmonic received signal and the fundamental wave signal acquired for the one ultrasonic beam direction, whether or not the processing in steps S13 to S17 has been executed on all pixels (S18). When the processing in steps S13 to S17 has not been executed on all pixels, the controller 22 returns to step S13, and acquires the next processing target pixel information from the plurality of pixels aligned in the depth direction (S13). When the controller 22 determines that the processing in steps S13 to S17 has been executed on all pixels, the controller 22 ends the processing in steps S11 to S18 for the one ultrasonic beam direction. The controller 22 executes processing in steps S11 to S18 for each ultrasonic beam direction that changes with scanning.

Every time the controller 22 acquires the region identifying pixel information (Ph, P1, F) for one frame (for one piece of image), the controller 22 generates irradiated-region data, B-mode irradiated-region image data, or B-mode image data, based on the region identifying pixel information (Ph, P1, F) for the one frame. According to these pieces of image data, the pixels indicating a cavitation region and the pixels indicating a normal region are displayed in different manners. For example, when the flag information F included in the region identifying pixel information (Ph, P1, F) is 1, the controller 22 assigns a color, which is assigned to the cavitation region, to the higher harmonic received signal value Ph or the fundamental wave received signal value P1. Moreover, when the flag information F included in the region identifying pixel information (Ph, P1, F) is 0, the controller 22 assigns a color, which is assigned to the normal region, to the higher harmonic received signal value Ph or the fundamental wave received signal value P1.

In the above, the embodiment in which the processing in steps S13 to S17 is executed for the higher harmonic received signal and the fundamental wave signal acquired for the one ultrasonic beam direction was described. The processing in steps S13 to S17 may be executed for a plurality of fundamental wave received signals of one frame and a plurality of fundamental wave received signals. For example, when imaging ultrasonic waves as plane waves are transmitted from the ultrasonic probe 16, a plurality of higher harmonic received signals are simultaneously acquired with respect to a plurality of imaging ultrasonic transducers 28, and a plurality of fundamental wave received signals are simultaneously acquired. Therefore, the processing in steps S13 to S17 may be executed for each of the plurality of pixels of one frame. In this case, the cycle of processing from steps S13 to S18 is executed on one processing target pixel selected sequentially from the plurality of pixels aligned in one frame; that is, one observation surface. In this case, the higher harmonic received signal value Ph and the fundamental wave received signal value Pl may be values obtained by taking a moving average of the processing target pixel and pixels around the processing target pixel.

Thus, the controller 22 of the HIFU irradiation device 1 according to the present embodiment constitutes an ultrasonic image processing device. The controller 22 executes reception processing for acquiring a plurality of received signals. The reception processing is processing for acquiring a plurality of received signals based on a plurality of ultrasonic waves transmitted from the ultrasonic probe 16 at different phases and timings, reflected by the body tissue, and received by the ultrasonic probe 16.

The controller 22 executes combining processing for generating a higher harmonic received signal by adding together (combining) a plurality of received signals. The controller 22 acquires a fundamental wave received signal that is one of the plurality of received signals. Further, the controller 22 executes comparison processing for finding the comparison value C representing the difference between the value of the higher harmonic received signal and the value of the fundamental wave received signal.

The controller 22 executes determination processing for determining whether or not the processing target pixel (ultrasound pixel) indicated by the higher harmonic received signal or the fundamental wave received signal indicates a cavitation region or a normal region. This determination processing includes processing for determining that the ultrasound pixel indicates a cavitation region if the comparison value C corresponding to the processing target pixel indicates that the value of the higher harmonic received signal is greater than the value of the fundamental wave received signal by a predetermined amount.

Moreover, the plurality of received signals are signals based on a plurality of reflected ultrasonic waves received by the ultrasonic probe 16, based on M types of ultrasonic waves sequentially transmitted from the ultrasonic probe 16 with a phase difference of 360°/M.

According to the processing executed by the controller 22, when the B-mode irradiated-region image is displayed on the display device 26, a cavitation region and a normal region are displayed in different manners. Consequently, a region in which bubbles based on therapeutic ultrasound are formed is clearly indicated.

Figure 4:
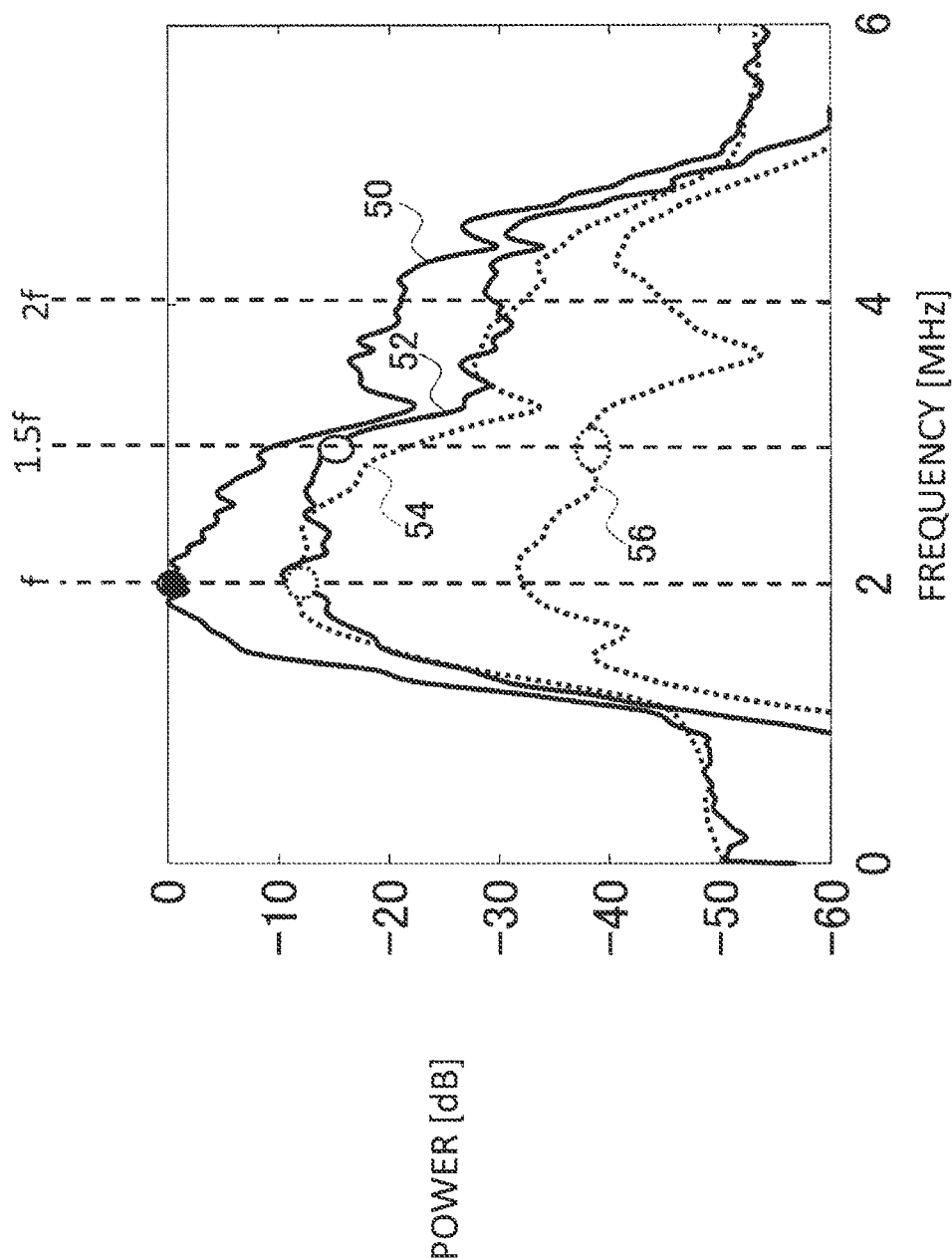
FIG. 4 is a view showing the frequency spectrums of power of fundamental wave received signals and higher harmonic received signals.

The principle of the cavitation region discrimination processing will be described. FIG. 4 shows the frequency spectrums of power (energy per unit time) of fundamental wave received signals and higher harmonic received signals. The frequency spectrum is obtained under conditions that imaging ultrasonic waves forming an ultrasonic beam are transmitted from the ultrasonic probe 16 to the body tissue, and reflected ultrasonic waves are received by the ultrasonic probe 16.

A central frequency f of the imaging ultrasonic waves to be transmitted from the ultrasonic probe 16 to the body tissue is 2 MHz. The ultrasonic probe 16 has a filter characteristic that attenuates higher harmonic components of the received signals. The ultrasonic probe 16 of the present embodiment attenuates a signal which is output from the ultrasonic probe 16 in a higher frequency band than a frequency 1.5f.

In FIG. 4, a frequency spectrum 50 of a fundamental wave received signal based on reflected ultrasonic waves generated in a cavitation region and a frequency spectrum 52 of a higher harmonic received signal are shown with solid lines. Moreover, a frequency spectrum 54 of a fundamental wave received signal based on reflected ultrasonic waves generated in a normal region, and a frequency spectrum 56 of a higher harmonic received signal are shown with broken lines. Each frequency spectrum was obtained by a simulation. The values on the vertical axis in FIG. 4 are standardized by setting the maximum value of power per unit frequency band width of the fundamental wave received signal to 0 dB.

It has been known that, when imaging ultrasonic waves 46 are transmitted three times at different timings by shifting the phase by 120° each time, at least a component of frequency 1.5f and a component of frequency 3f appear in the higher harmonic received signals. Moreover, as is confirmed from FIG. 4, the comparison value C found for the cavitation region is greater than the comparison value C found for the normal region.

Therefore, in the cavitation region discrimination processing, the processing target pixel with the comparison value C greater than the threshold T is determined to be a pixel indicating the cavitation region, and the processing target pixel with the comparison value C equal to or less than the threshold value T is determined to be a pixel indicating the normal region.

The tendency (region-dependent tendency) that the comparison value C found for the cavitation region is greater than the comparison value C found for the normal region is more noticeable in a frequency band lower than the frequency 1.5f. In the HIFU irradiation device 1 according to the present embodiment, the use of the frequency characteristic of the ultrasonic probe 16 makes the region-dependent tendency noticeable. Note that the region-dependent tendency may be made noticeable by the frequency characteristic of a filter which is provided separately from the ultrasonic probe 16, instead of using the frequency characteristic of the ultrasonic probe 16. In this case, the ultrasonic transceiver 20 may have a filter for attenuating the higher harmonic components of the received signals.

What is claimed is:

1. An ultrasonic image processing device comprising a controller that executes:
    reception processing for acquiring a plurality of received signals based on a plurality of ultrasonic waves transmitted from an ultrasonic probe at different phases and timings, reflected from body tissue, and received by the ultrasonic probe;
    combining processing for generating a higher harmonic received signal by combining the plurality of received signals; and
    comparison processing for finding a comparison value representing a difference between a value of the higher harmonic received signal and a value of a fundamental wave received signal that is one of the plurality of received signals, wherein the controller executes determination processing for determining, based on the comparison value, whether an ultrasound pixel indicated by the higher harmonic received signal or the fundamental wave received signal indicates a cavitation region or a normal region, and generation processing for generating, based on the higher harmonic received signal or the fundamental wave received signal, image data for displaying the cavitation region and the normal region in different manners, and the determination processing includes processing for determining that the ultrasound pixel indicates the cavitation region based on a comparison between the comparison value and a predetermined threshold, wherein the predetermined threshold is a value obtained based on (a) the value of the fundamental wave received signal which is obtained when therapeutic ultrasound is not transmitted to the body tissue by a high intensity focused ultrasound (HIFU) irradiation device and on (b) the value of the higher harmonic received signal.

2. The ultrasonic image processing device according to claim 1, wherein the plurality of received signals are signals based on a plurality of reflected ultrasonic waves received by the ultrasonic probe, based on M types of ultrasonic waves sequentially transmitted from the ultrasonic probe with a phase difference of 360°/M.

3. The ultrasonic image processing device according to claim 1, wherein the comparison value is a value based on a ratio of the value of the higher harmonic received signal to the value of the fundamental wave received signal.

4. The ultrasonic image processing device according to claim 1, wherein the ultrasonic probe has a filter characteristic that attenuates higher harmonic components of each of the received signals.

5. The ultrasonic image processing device according to claim 1, wherein the ultrasonic image processing device comprises a filter for attenuating higher harmonic components of each of the received signals, and the determination processing is processing based on each of the received signals with the higher harmonic components attenuated by the filter.

6. The ultrasonic image processing device according to claim 1, wherein the combining processing comprises adding the plurality of received signals together, wherein the plurality of received signals are received at the different phases and timings, wherein the adding decreases the fundamental wave component due to respective phase relations among at least two harmonic components of the plurality of received signals.

7. The ultrasonic image processing device according to claim 6, wherein the combining further includes adding the fundamental wave component to produce the higher harmonic received signal.

8. The ultrasonic image processing device according to claim 1, wherein the value of the higher harmonic received signal or the value of the fundamental wave received signal or both is/are obtained by taking a moving average of other ultrasonic pixels besides an ultrasound target pixel indicated by the higher harmonic received signal or by the fundamental wave received signal.

9. The ultrasonic image processing device according to claim 8, wherein the moving average of other ultrasonic pixels is a moving average of other ultrasonic pixels aligned in a shallower direction or in a deeper direction from the ultrasonic target pixel.

10. The ultrasonic image processing device according to claim 8, wherein the moving average of other ultrasonic pixels is a moving average of other ultrasonic pixels aligned in a shallower direction and in a deeper direction from the ultrasonic target pixel.

11. The ultrasonic image processing device of claim 8, wherein the moving average is of the other pixels and the ultrasonic target pixel.

\* \* \* \* \*